United States Patent Office 3,462,608
Patented Aug. 19, 1969

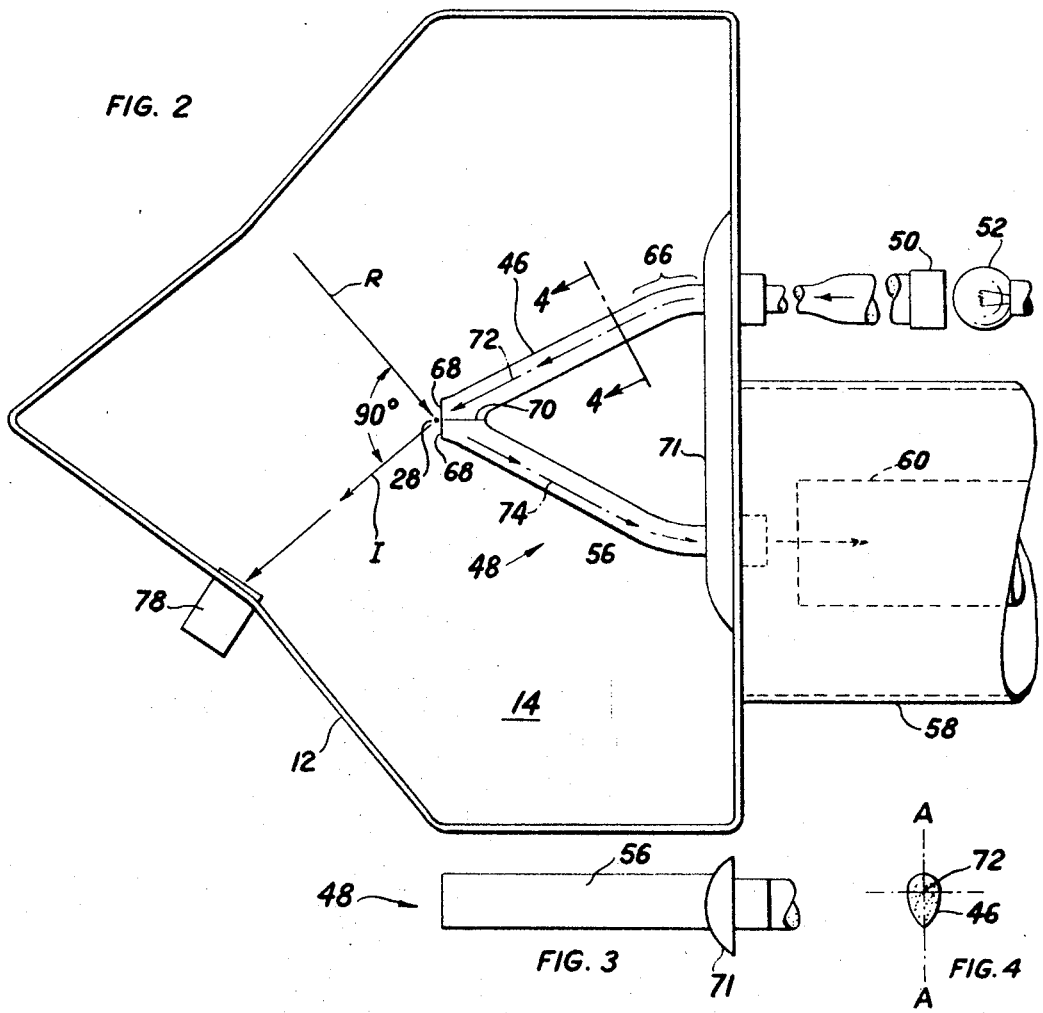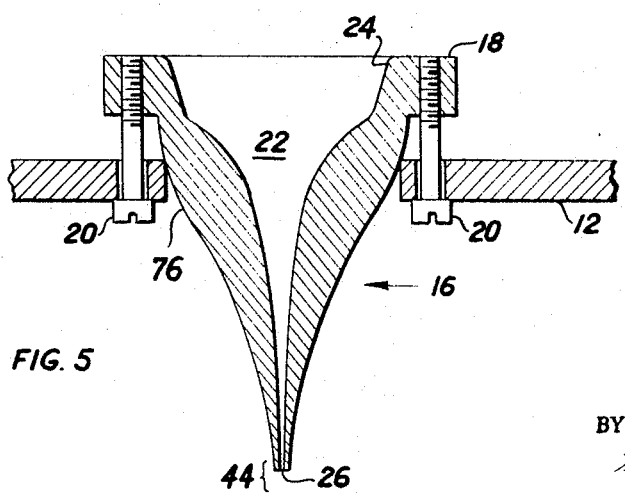

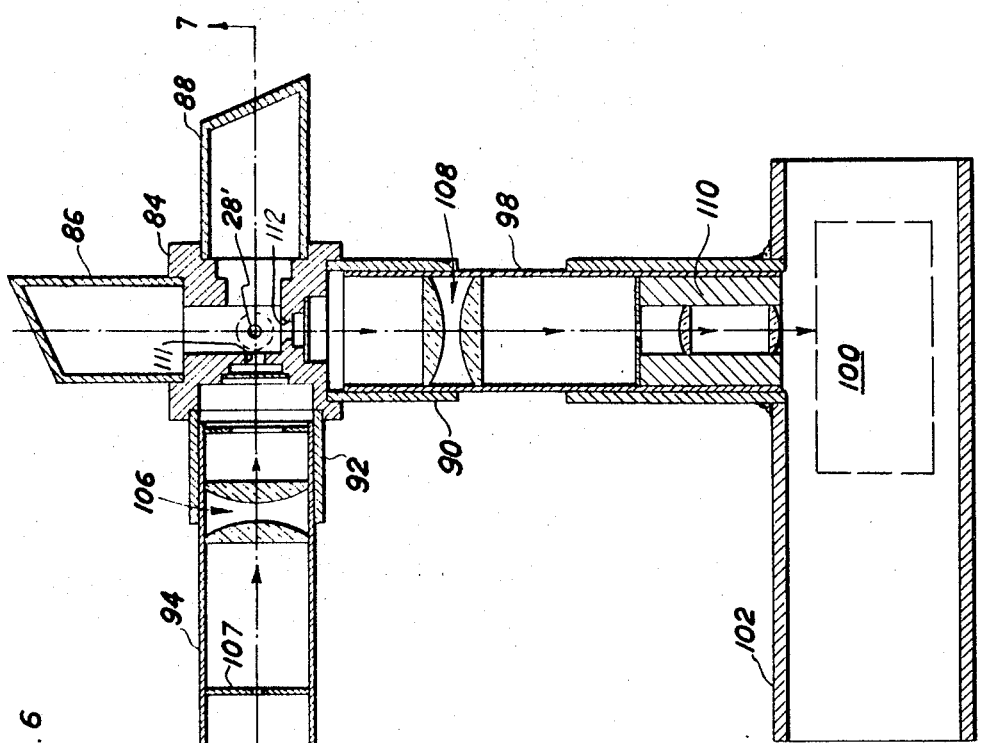
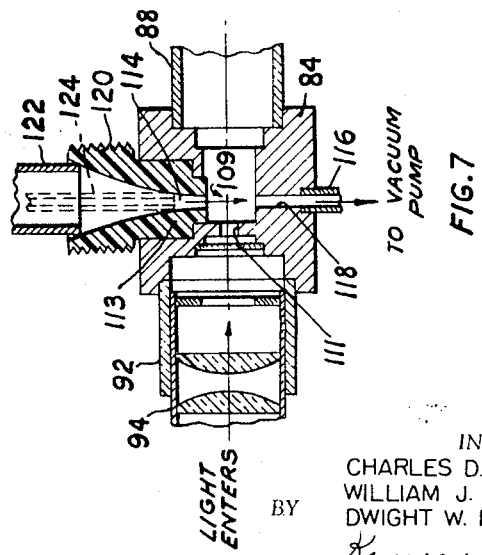

3,462,608
METHOD AND APPARATUS FOR DETECTING SUSPENDED PARTICLES
Charles D. Weston, Sugar Hill, N.H., and William J. Gagnon, Jr., Falmouth, and Dwight W. Reynolds, Pownal, Maine, assignors to Dynac Corporation, Portland, Maine, a corporation of Maine
Filed Dec. 19, 1966, Ser. No. 602,684
Int. Cl. G01n 21/26
U.S. Cl. 250—218                                    19 Claims

ABSTRACT OF THE DISCLOSURE

This application describes a method and apparatus for detecting particles of matter suspended in a compressible fluid such as air. A sample is drawn from the outlet of a sampling passage by maintaining a pressure at or below the critical value. A beam of light is projected upon the emerging fluid at or near the outlet and reflections from moving particles are photoelectrically detected. In a space through which the fluid to be sampled is moving, the passage withdraws the sample from the space at or near the prevailing mass rate of flow per unit of area in a plane transverse to the flow direction.

---

The present invention relates generally to methods and instruments for sampling compressible fluids for detection of suspended and dispersed particles of matter. It is more particularly concerned with methods and instruments capable of measuring the number of particles in a specified volume of the sampled fluid, and in some applications, of distinguishing between particles of differing sizes.

This art has received considerable impetus from industrial and research applications in which a work space is required to be kept relatively free of atmospheric particulate contaminants, commonly dust of various forms. The work space may be the size of a room, or only of an enclosure over a work bench, instrument or tool.

It is an object of this invention to provide portable, light weight means to sample the air or other fluid which is commonly caused to flow through a space, or any other space to be monitored for fluid-borne particles. Hitherto, a considerable variety of instruments have been employed for the sampling of dust suspended in air. Many of the methods do not seek to detect the particles individually, but to accumulate them, for example on a filter, in order to obtain a gross measurement. Such gross measurements may include the weight of the material collected in a measured length of time, or variations in light depending upon the dust load, for example. Many of the methods that do include the analysis of individual particles commonly employ a microscope together with counting and statistical techniques relying upon human skill, but such methods are severly limited in their capacity to provide quick, accurate and reliable quantitative information as to the number of particles in a unit volume of the sampled air and the quantitative distribution of the particles by sizes.

It is accordingly a second and related object of this invention to provide a method and apparatus for detecting individual particles seriatim, coupled with the capacity for differentiating the particles by their sizes. Such capabilities are of particular value in monitoring so-called "clean spaces" for compliance with manufacturing and operational specifications now commonly employed. One such specification, for example, requires that a given clean space shall not contain more than 10,000 particles per cubic foot in a size range of 0.5 micron to 5.0 microns, nor more than 65 particles per cubic foot in the size range above 5.0 microns. These figures are cited as typical and not of a limiting case.

A further object of the invention is to provide a method and apparatus that can be employed with a minimum of human skill and manipulation, and minimum statistical error, error due to the mode of sampling and calibration drift, so that the results obtained may be uniform, thereby providing a standard sampling procedure that will be reliable under varying conditions of use and with different operators.

Further objects of the invention are to overcome some of the well-known deficiencies of prior sampling methods. More specifically, it is an object to provide means for optically sampling and detecting the particles by reflected light. Reflections from individual moving particles can be used to produce photoelectric impulses which may be counted electronically or otherwise; and if the light source is controlled it is also possible to distinguish larger particles from smaller ones by the amplitudes of the photoelectric impulses. In general, the intensity of reflected light varies as the square of the particle diameter. Means as thus generally described are not new in the art, but they have been largely unreliable because of a number of factors including a low signal-to-noise ratio. This has resulted in some cases from uncertainties as to the quantity of air sampled in a unit of time, and as to the percent of the particles in the sample that actually produce distinct impulses. Accordingly, it is an object of this invention to increase the signal-to-noise ratio and to eliminate or substantially reduce the uncertainties described herein.

Having in view the above and other objects hereinafter appearing, the features of this invention reside in a method of fluid sampling in which the fluid is drawn into a converging tubular passage having a throat, while projecting a beam of light upon the fluid at or adjacent the throat and photoelectrically detecting the reflections of the light from the individual particles, thereby generating electrical impulses.

One form of this invention features fiber optical bundles, whereby the light is concentrated by one bundle upon the stream of fluid at or near the throat and so directed as to produce reflections from all of the particles throughout the cross-section of the stream, and reflections are collected and directed with minimal losses through a second bundle of fiber optical elements to a photoelectric element.

Another form of the invention has systems of lenses to concentrate the light upon the stream of fluid and to direct the reflected light to the photoelectric element. A lens system is adapted to focus the light sharply and intensely in the inspection zone at or near the throat so that any particle passing through the inspection zone will be illuminated. A portion of the light resulting from this illumination enters an exit lens system focused on the photoelectric element. The housing which surrounds the inspection zone is so constructed that light which does not enter directly into the exit lens system is absorbed in light traps, and stray light is thus eliminated. A calibration system insures that the light source is provided with a power supply of the proper voltage. This furnishes a quick method of calibrating the light in the lens system, thus insuring the reliability of the device as a measuring instrument.

A feature of the method described herein and incorporated in each instrument resides in the employment of fluid flow principles, which are characteristic of converging tubes, to insure a uniform rate of flow of sampled fluid. This uniformity includes achievement of a constant weight rate of flow of the sample through the inspection zone, substantially or entirely independent of variations in the pressure differential producing the flow. It also preferably includes the withdrawal of the sample at or near the same velocity and weight rate of flow per unit of area transverse to the flow direction, which prevail in the space to be sampled.

Other features of the invention reside in certain features of the method and of the apparatus herein described which will be more clearly evident from the following description of the method and of the preferred apparatus for carrying it out, as hereinafter described with reference to the appended drawings in which:

FIG. 2 is a plan view in section of the sampling chamber and related optical parts of FIG. 1 with the axis of symmetry of the converging tube perpendicular to the figure;

FIG. 3 is a side elevation of the fiber optical member;

FIG. 4 is a view in section taken on line 4—4 of FIG. 2;

FIG. 5 is a side elevation in section of the converging tube;

FIG. 6 is a plan view in section of a second form of apparatus using a lens system, and oriented the same as FIG. 2 in relation to the axis of symmetry of the converging tube; and FIG. 7 is an elevation in section taken on line 7—7 of FIG. 6.

Figure 1:
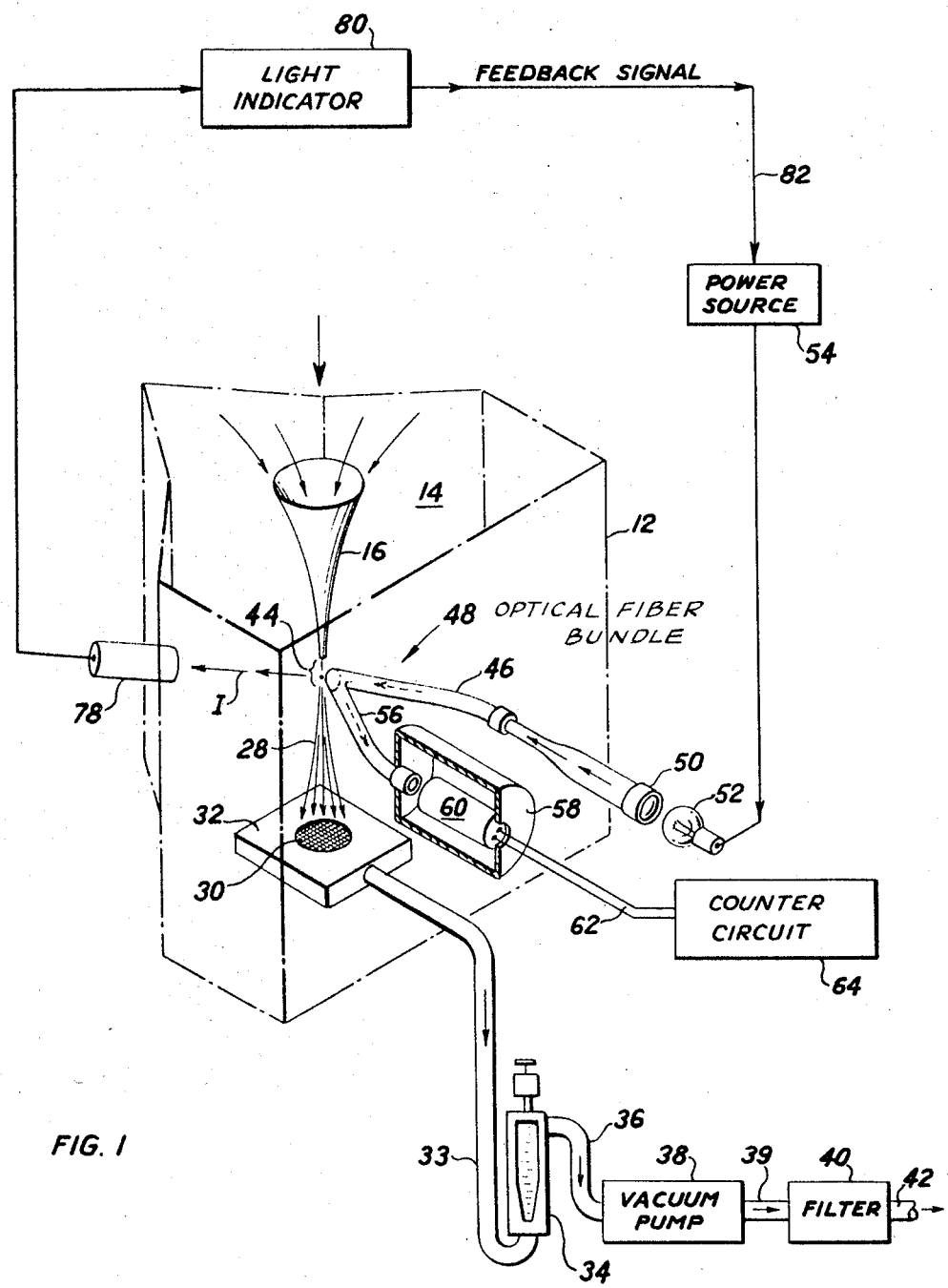
FIG. 1 is a view in perspective and partly in diagrammatic form of the principal parts of a first form of the sampling apparatus.

Referring to FIG. 1, the principal parts of the first form of the fluid sampling instrument are shown in a preferred arrangement for sampling air in a work space. It will be understood that while the term "air" is used in this description it is not intended to exclude the use of any other compressible fluid containing suspended particles.

A light box 12 is formed of sheet metal to define a sampling chamber 14 which, in the finally assembled condition, is substantially completely shielded from external light. The upper wall of the box has a circular opening into which is fastened a converging tube member 16 (FIG. 5) having a flange 18 adapted to receive three mounting screws 20. The tube 16 defines a converging passage 22 between an inlet or opening 24 and an outlet or throat 26 which has the minimum cross-sectional area. Air flows into inlet 24, through the tube, and is ejected into the chamber 14 as a stream 28. The air stream 28 passes through a filter 30 in a filter support 32 mounted in the bottom wall of the box 12.

The air then passes through a tube 33, a conventional flow meter 34 and a tube 36 to a vacuum pump 38 which provides a vacuum within the chamber 14 sufficient to cause a flow of air at the required, accurately determined, rate as hereinafter more fully described. Finally, the air passes through a tube 39 to a filter 40 which exhausts at such a rate and in such a location that substantially none of the air exhausted during a sampling period will mix with the air being sampled during the same period.

One form of the described apparatus samples air at the rate of 650 cc./minute, which would cause the passage of one cubic foot of air in about 44 minutes. For an accurate dust count, a typical sampling period may be only 5 minutes at this rate of flow. Thus the exhaust outlet 42 may be situated within a short distance, perhaps less than two feet, of the inlet 22 without materially affecting the air sampled during the 5 minute period. In this example the throat 26 of the tube 16 may have an inside diameter of only about one or two sixty-fourths of an inch.

Immediately as the air stream 28 leaves the throat 26 of the tube 16, it enters an inspection zone 44 in which the entire cross-section of the stream is illuminated by an intense beam of light emerging from one branch 46 of a bifurcated fiber optical member 48 supported in the box 12. This branch is terminated in a collector lens portion 50 of a somewhat larger diameter. A continuous lamp 52, for example an incandescent lamp, is connected with a power source 54, whereby the inspection zone 44 is continuously illuminated and a beam of light impinges upon all of the particles throughout the cross-section of the stream 28 at an angle of approximately 90° to the direction of flow.

Light rays reflected from the particles at right angles pass through the other branch 56 of the member 48, this branch terminating within an enclosed light-tight housing 58 mounted externally to the box 12 and containing a photocell 60. Preferably, the photocell is of the very sensitive type commonly known as a photomultiplier tube, with a reaction time of the order of 30 to 40 microseconds, or less. The cross-sectional dimensions of both branches of the fiber optical member 48 are large in relation to the diameter of the air stream 28, and therefore all of the particles within the air stream are illuminated and produce reflections that travel down the branch 56 to the photocell 60.

The photocell is connected by wires 62 to a counter circuit 64 adapted to count the photocell impulses resulting from the light reflections from individual particles, and to differentiate between the sizes of the particles by the intensity of the light reflections therefrom. Thus the larger particles will produce brighter light reflections, in general, and these will produce larger amplitude excursions of the photocell impulses.

Details of the counter circuit 64 will not be described as they form no part of the present invention and may be readily ascertained from available electronic literature. In general, the preferred apparatus includes a plurality of circuits diesgned to discriminate between pulses of different amplitudes, and to count the number of pulses received between accurately timed reset signals. In the alternative, a simplified form of the counter circuit 64 may comprise a circuit to count all of the pulses received consecutively over the wires 62 until the count is manually terminated.

As shown, the fiber optical member 48 is preferably fabricated as a bifurcated member. Two rods, each comprising a bundle of optical fibers according to well-known technology and having the stream-lined cross-section shown in FIG. 4, are bent as at 66 and formed with mutually perpendicular flats 68 and 70. The rods form the branches 46 and 56 each comprising a large number of filaments within which light may travel with little or no loss from end to end. The branches are joined at their surfaces 70 and also pass through holes in a mounting plate 71 fastened to the box 12. Thus the surfaces 68 of the branches lie in the same plane.

The stream of air 28 passes adjacent the surfaces 68, and its diameter is small in relation to the area of said surfaces. In the preferred form of the apparatus, for example, the diameter of the stream at any point within the zone 44 does not exceed 3/32 inch, while the major dimension A—A of the branches 46 and 56 (FIG. 4) is approximately 13/32 inch and the minor dimension at right angles to it is approximately 7/32 inch.

The angle formed between the branches 46 and 56 depends upon the refractive index between the fiber optical members and air. Referring to FIG. 2, an arrow I bears an angle to the principal axis 72 of the branch 46 corresponding to the refraction of a beam of light traveling down the axis and emerging into the stream 28. This beam, reflected from the surface of a typical particle in the stream, may be directed in an infinite number of possible directions because of the random orientation of its surfaces. However, there is a high probability that a beam so directed against each particle will be reflected at an angle of approximately 90°, as shown by an arrow R. The reflected beam, impinging upon the surface 68 of the branch 56, will be refracted into the direction of its principal axis 74. Preferably, the reflections at other angles from the particles are so dissipated with the chamber 14 as to have no appreciable additive effect to that of the 90° reflection. To this end, the box 12 is preferably shaped in a suitable manner as a form of light trap, and coated with a non-reflective coating of the kind commonly employed in cameras.

Preferably, the surfaces 70 of the branches 46 and 56 are cemented together with an opaque cement to avoid the spurious transmission of light from the branch 46 to the branch 56 by internal reflection.

The streamlined cross-section of the individual fiber optical rods produces a streamlined configuration at the joined ends of the branches, thereby minimizing the possibility of turbulence in the air stream 28 passing adjacent to it.

Referring to FIG. 5, the tube member 16 is molded of plastic in a mold which accurately defines both the interior and exterior surfaces. These surfaces are respectively designed to produce a laminar flow of air and to direct the stream 28 to a precisely defined position within the inspection zone 44, closely adjacent the surfaces 68 of the fiber optical member. A curved external portion 76 is of the general form of a spherical segment and has a diameter measured at right angles to the main axis of air flow that increases from a value below that of the opening in the box 12 to a value slightly above that diameter, whereby the three screws 20 may be tightened to prevent the admission of spurious light rays from outside the box and also independtly adjusted so as to permit adjustment of the position of the throat 26 in relation to the end of the fiber optical member 48.

The converging interior passage 22 is accurately shaped to minimize and preferably eliminate turbulence in the air flow throughout its length. As is well understood, turbulence tends to increase with an increase in flow velocity in confined passages, but the velocity at which turbulence becomes appreciable depends upon the shape of the flow passage, to a considerable degree. Also, it is well recognized that the internal surfaces of a flow passage frictionally impede the molecules of air closest thereto, with the result that at any cross-section the flow velocity is greatest at the axis of symmetry and drops off symmetrically in all directions toward the interior surfaces of the passage. As a further design consideration, the flow velocity at the inlet 22 is relatively low. As further pointed out below, the exit velocity at the throat 26 is substantially that of pressure propagation in the air, i.e., the velocity of sound. Having the foregoing and other pertinent characteristics of the apparatus and of the air itself in view, it is possible to form a converging passage 24 through which a laminar flow is experienced.

The characteristics or dynamics of compressible flow through a converging tube or orifice are well understood. However, it is not believed that there has previously been a recognition of the utility of certain of those characteristics in instruments of the present type. According to this invention, certain advantages are achieved by causing the vacuum pump to produce a vacuum within the chamber 14, relative to the prevailing atmospheric pressure in the space being tested, such that the weight rate of air flow through the converging tube 16 is substantially independent of fluctuations in the chamber pressure. Consequently, a smooth, steady flow of air is produced, which is unaffected by external fluctuations such as those that might be introduced by the motive source for the pump 38, for example.

To achieve this desired object, the pressure within the chamber 14 is maintained by the pump at a value somewhat below the so-called "critical pressure," which is defined in relation to the prevailing atmospheric pressure. This may be understood by considering the changes that occur in the weight rate of discharge through the converging passage 24 as the pressure within the chamber is depressed below the value of the prevailing atmospheric pressure. When the chamber pressure initially equals the prevailing pressure the rate of discharge is zero. As the chamber pressure is decreased, the weight rate of discharge increases, and at the same time, the flow velocity at the throat 26 increases. The increase in the weight rate of discharge and the throat velocity continues as the chamber pressure is further reduced, but the rate of increase in each case tapers off until, at the "critical pressure," a maximum weight rate of discharge is attained. Further reductions in the chamber pressure below this value have no appreciable effect upon the weight rate of discharge, which remains at the maximum value. When the chamber pressure is at or below the critical value, the flow velocity at the throat is equal to the velocity of pressure propagation in the air, that is, the velocity of sound. In other words, the pressure in the chamber cannot be telegraphed back into the throat of the nozzle because the air in the throat is moving with the velocity of pressure propagation. By this means it is insured that a uniform, accurately defined quantity of air will pass through the apparatus in a measured length of time.

With the chamber pressure at or below the critical value, the velocity of sample air entering the inlet 24 is relatively very slow and the speed increases progressively as the air approaches the throat 26. This makes it possible for the instrument to perform what is referred to herein as "iso-kinetic" sampling of the supply or sample air. This is defined as sampling with the inlet 24 facing generally opposite to the prevailing direction of air flow in the space to be sampled, and in which the velocity at the inlet 24 and the weight rate of flow per unit area at the inlet equal the corresponding quantities prevailing in the space to be sampled. It is obvious that if air is led to a given throat 26 at which the pressure differential is at or above the critical value, through an inlet 24 of given diameter, the air will move at some particular velocity at the inlet. Supply air led to the same throat through an inlet of smaller diameter must have a greater velocity at the inlet, but in either case the velocity of air through the throat and in the immediately adjacent inspection zone will remain unchanged at or near the speed of sound.

By careful selection of the size of the inlet bringing supply air to the throat 26, the speed of the air into the inlet can be made to equal the speed of suply air flowing through a clean box or a clean room to be sampled. When such conditions apply, the air to be sampled is withdrawn from the supply air smoothly and with a minimum of turbulence as it enters the inlet leading to the throat. This insures that the inlet 24 of the sampling passage 22 or "probe" will produce minimum disturbance in the flow at the point where the sample is extracted, and that a more precise particle count can be taken at critical points in the clean box or clean room.

It will be apparent that the illustrated apparatus is designed to concentrate the maximum amount of light directly upon the air stream 28 and to direct the reflections from particles therein to a sensitive photocell with minimal loss, thereby providing a high signal-to-noise ratio and greatly increasing the dependability of the instrument over those hitherto employed.

Another advantage of the apparatus is that it greatly increases the probability of obtaining a distinct photoelectric impulse from each and every particle in the air stream 28, that is, of obtaining a seriate arrangement of the particles in the volume of air to be sampled during any given test period. Thus the total volume of air passing through the apparatus during any test period is transformed into a very long column of minute cross-section moving at a velocity at or near that of sound in air, with only a minute section of such column being viewed within the inspection zone 44 at any given instant. The probability of failure to obtain a distinct photoelectric impulse from each particle is greatly reduced.

A calibration of the instrument is afforded by a photoelectric sensor 78 (FIG. 1) which is mounted on the box 12 and generally aligned with the arrow I of FIG. 2. The sensor is connected with a light indicator 80 (FIG. 1) which in turn may be connected by a circuit 82 with the power source 54. The sensor 78 is actuated by non-reflected light from the branch 46. Adjustment in the power source 54 may be manual, or it may be provided automatically by means well understood in the art.

The above-described apparatus is extremely sensitive, and has been used successfully to obtain quantitative data on dust particles down to a size of 0.5 micron.

It will be further observed that the above-described arrangement of fiber optical elements, utilizing the lens 50 to collect the light in a relatively large cone of dispersion, is not sensitive to the precise position of the filament within the continuous lamp 52, which may be an incandescent lamp. Accordingly, there is less likelihood of a drift in the calibration of the instrument with the age or condition of the source 52, and the replacement of bulbs requires no mechanical adjustment and only such adjustment in the applied voltage as may be necessary to insure a continuity in the value of light intensity as shown by the indicator 80.

It will be apparent that the apparatus is so designed that different volume rates of flow may be provided by the use of tubes 16 having different sizes of throat 26. For extremely accurate results, the throat 26 is preferably of the smallest practicable diameter and the weight rate of flow is correspondingly small.

FIGS. 6 and 7 show the principal parts of a second form of the fluid sampling instrument, in which the fiber optical elements are replaced by a system of lenses. An air stream 28 is preferably produced by the means of the same type described above and shown in FIG. 1. A metal frame or light box 84 has four attached support tubes 86, 88, 90 and 92. The tubes 86 and 88 have angular end walls which act as effective light traps to eliminate the effects of stray light. The tube 92 adjustably receives a lens assembly 94 aligned with a tungsten filament lamp 96, and the tube 90 adjustably receives a lens assembly 98 aligned with a photomultiplier tube 100 within a light-tight housing 102.

The lens assembly 94 has two pairs of plano-convex lens elements 104 and 106 separated by an aperture plate 107. These lenses condense the white light from the filament of the lamp 96 and concentrate the beam in an inspection zone 109.

The light which is reflected from particles in the stream at an angle of 90 degrees is collected by a pair of plano-convex lenses 108, passes through a microscope objective assembly 110, and is focussed on the photomultiplier tube 100. The photo-multiplier tube is connected as in FIG. 1 to provide a useful pulse output of the type described above.

Integral apertures or light stops 111 and 112 are drilled very accurately in the light box 84 and serve to control the light beam very precisely in spatial relation to the inspection zone 109.

A cast plastic insert 113 is push fitted in a hole in the light box 84, and has a tapered passage 114 similar to the passage 22 in FIG. 5. A tube 116 is fitted to a hole 118 in the light box and is connected to a vacuum pump line similarly to the tube 33 in FIG. 1. The insert preferably has external threads 120 to receive a cover cap (not shown) when the instrument is not in use.

A sample tube 122 of uniform cross section is in contact with the converging wall of the passage 114. Tubes of various other diameters may be substituted for the tube 122, as indicated by phantom lines 124, for the purpose of attaining iso-kinetic sampling as described above in relation to FIG. 1.

The manner in which the lens assemblies project light into the inspection zone 109 as well as the path by which reflections emerge from the inspection zone to the photomultiplier tube are of importance. The beam from the light source is focussed on the inspection zone in a converging conical pattern. The beam is confined to a very small area in the inspection zone by the integral stops 111 and 112 so that no illumination reaches other portions of the interior of the light box than the inspection zone and the light trap 88 behind it. Otherwise, interior reflections might reach the photomultiplier tube and indicate the presence of a particle in the inspection zone when, in fact, no particle is present.

Similarly, illumination reflected from a particle is only received by the photomultiplier tube when the particle is positioned at that spot in the inspection zone where maximum reflection is generated. Reflections generated before or after the particle reaches the inspection zone would give erroneous indications of particle size and would increase the chance of error caused by generating a single impulse from two contiguous particles.

The optical stops 111 and 112 provide a very effective method for limiting the sizes of the illuminating cone and the sighting cone leading to the photomultiplier tube. To position such stops to best advantage, the light box 84 has these stops integrally machined therein, as previously stated. By this means the inner edges of the openings in the stops can be located extremely close to the inspection zone without interfering with the light source cone pattern and the sighting cone leading to the photomultiplier tube. The use of integral stops insures the closest aperture position adjacent the inspection zone that can be achieved, eliminates positioning errors incidental to the use of assembled stops, and prevents changes in the position of the stops during use.

It is evident that the foregoing description will suggest or make apparent various modifications of structure as well as of method, all of which will secure the advantages of the invention and are intended to fall within the scope of the appended claims.

Having thus described the invention, we claim:

1. Apparatus for detecting particles suspended in a compressible fluid including, in combination,
   a converging tube having an inlet into which the fluid may flow and a throat portion of smaller sectional area than the inlet,
   vacuum means to apply a pressure at the throat which is at or below the critical pressure, thereby causing the fluid at the throat to flow at the velocity of pressure propagation,
   a source of light having means to direct a beam upon the fluid at the throat, and
   a photoelectric detector supported in position to receive reflections from the illuminated particles and generating impulses corresponding thereto.

2. The combination according to claim 1, in which the photoelectric detector receives impulses from all of the particles passing through the throat.

3. The combination according to claim 1, in which the inlet has an area of a size producing substantially the same velocity and weight rate of flow per unit area at the inlet as prevail in the surrounding space, when the pressure at the throat is at or below the critical pressure.

4. The combination according to claim 1, including a light box having attachment to the converging tube, vacuum means, light source and photoelectric detector, and having integral apertures adjacent the throat portion of the tube to define a precise inspection zone for illumination.

5. The combination according to claim 1, in which the source of light directs the beam substantially transversely to the flow path of the fluid at the throat and the detector is adapted to receive reflections transverse to said flow and at approximately ninety degrees to the beam from the source of light.

6. The combination according to claim 1, including a fiber optical member in the path of light having an end adjacent the fluid at the throat.

7. The combination according to claim 1, including a fiber optical member having two branches with ends respectively adjacent the source of light and the detector and ends adjacent the fluid at the throat.

8. The combination according to claim 1, with a counter to count the impulses.

9. The combination according to claim 1, including lens means in the path of light having an end adjacent the fluid at the throat.

10. Apparatus for detecting particles suspended in a compressible fluid including, in combination, a converging tube having an inlet into which the fluid may flow and a throat portion of smaller sectional area than the inlet, vacuum means to apply a pressure at the throat which is at or below the critical pressure, thereby causing the fluid at the throat to flow at the velocity of pressure propagation, a source of light, a photoelectric detector adapted to generate impulses corresponding to reflections from illuminated particles, and a fiber optical member having two branches with ends respectively adjacent the source of light and the detector and ends joined at an acute angle and having coplanar end surfaces adjacent the fluid at the throat.

11. The combination according to claim 10, in which said joined ends are streamlined adjacent the flow path of the fluid.

12. The combination according to claim 10, in which the branches of the fiber optical member are rod-like and said joined ends each have mutually perpendicular flat end surfaces, one said surface being joined to a corresponding surface of the other branch and the other said surface being coplanar with a corresponding surface of the other branch.

13. The method of detecting particles suspended in a compressible fluid, which consists in drawing a sample of said fluid continuously and confining the same in a converging flow path terminating at an inspection zone, subjecting the sample to a pressure differential sufficient to maintain the fluid velocity in the inspection zone equal to that of pressure propagation in said fluid, projecting a beam of light upon the fluid in the inspection zone, and detecting the reflections of said beam from individual particles in the fluid and generating electrical impulses corresponding thereto.

14. The method according to claim 13, in which the detection is substantially restricted to ninety degree reflections from the particles.

15. The method of claim 13, in which substantially laminar flow is maintained in the inspection zone.

16. The method of claim 13, in which a portion of the light beam is totally confined within a path terminating adjacent the inspection zone.

17. The method according to claim 13, in which the sample is drawn from the fluid at the same velocity and weight rate of flow per unit area that prevail in the surrounding space.

18. The method according to claim 13, including counting the electrical impulses.

19. The method according to claim 18, including filtering the fluid and exhausting it into the space from which it was drawn.

References Cited

UNITED STATES PATENTS

| | | | |
|---|---|---|---|
| 2,324,304 | 7/1943 | Katzmann | 250—218 |
| 2,436,262 | 2/1948 | Miller | 250—218 |
| 2,535,181 | 12/1950 | Way | 250—218 |
| 2,731,877 | 1/1956 | Clamann | 250—218 |
| 2,873,644 | 2/1959 | Kremen | 250—218 |
| 2,982,131 | 5/1961 | Rosinski | 73—170 |
| 3,120,125 | 2/1964 | Vasel | 250—227 |
| 3,202,826 | 8/1965 | Greathouse | 250—218 |
| 3,261,199 | 7/1966 | Raynor | 73—28 |
| 2,920,525 | 1/1960 | Appel et al. | 356—102 X |

ARCHIE R. BORCHELT, Primary Examiner

C. M. LEEDOM, Assistant Examiner

U.S. Cl. X.R.

73—28; 250—43.5; 356—207